US012037931B2

(12) United States Patent
Li

(10) Patent No.: US 12,037,931 B2
(45) Date of Patent: Jul. 16, 2024

(54) DEVICE INCREASING ENGINE EFFICIENCY AND REDUCING EXHAUST AND NOISE

(71) Applicant: Szu Cheng Ma, Taoyuan (TW)

(72) Inventor: Huan Pien Li, Taoyuan (TW)

(73) Assignee: Szu Cheng Ma, Taoyuan (TW)

( * ) Notice: Subject to any disclaimer, the term of this patent is extended or adjusted under 35 U.S.C. 154(b) by 106 days.

(21) Appl. No.: 18/047,425

(22) Filed: Oct. 18, 2022

(65) Prior Publication Data

US 2024/0125261 A1 Apr. 18, 2024

(51) Int. Cl.

| | |
|---|---|
| ***F01N 3/10*** | (2006.01) |
| ***F01N 3/20*** | (2006.01) |
| ***F01N 3/28*** | (2006.01) |
| ***F01N 3/30*** | (2006.01) |
| ***F01N 5/04*** | (2006.01) |
| ***F01N 13/00*** | (2010.01) |
| ***F01N 13/14*** | (2010.01) |
| ***F02M 27/02*** | (2006.01) |
| ***F02M 27/06*** | (2006.01) |
| ***F02M 35/12*** | (2006.01) |

(52) U.S. Cl.

CPC ........... *F01N 3/206* (2013.01); *F01N 3/2086* (2013.01); *F01N 3/2896* (2013.01); *F01N 3/303* (2013.01); *F01N 5/04* (2013.01); *F01N 13/009* (2014.06); *F01N 13/14* (2013.01); *F02M 27/02* (2013.01); *F02M 27/06* (2013.01); *F02M 35/125* (2013.01); *F02M 35/1255* (2013.01); *F01N 3/2053* (2013.01); *F01N 2240/28* (2013.01); *F01N 2610/01* (2013.01); *F01N 2610/144* (2013.01); *F01N 2610/146* (2013.01)

(58) Field of Classification Search

CPC .... F01N 3/206; F01N 3/2896; F01N 2240/28; F01N 2610/01

See application file for complete search history.

(56) References Cited

U.S. PATENT DOCUMENTS

| | | | | |
|---|---|---|---|---|
| 4,665,690 | A * | 5/1987 | Nomoto | F01N 3/029 422/111 |
| 6,940,983 | B2 * | 9/2005 | Stuart | G10K 11/17855 381/71.4 |
| 2003/0178248 | A1 * | 9/2003 | Mammarella | F02M 35/1261 181/206 |
| 2004/0128989 | A1 * | 7/2004 | Watanabe | B01D 53/885 60/298 |
| 2018/0163588 | A1 * | 6/2018 | Nagaoka | F01N 3/206 |
| 2022/0062820 | A1 * | 3/2022 | Matsuba | B01D 53/32 |

FOREIGN PATENT DOCUMENTS

| | | | | |
|---|---|---|---|---|
| DE | 19933442 | B4 * | 3/2009 | B01D 53/944 |

* cited by examiner

*Primary Examiner* — Jonathan R Matthias

(74) *Attorney, Agent, or Firm* — Rosenberg, Klein & Lee

(57) ABSTRACT

A device increasing engine efficiency and reducing exhaust and noise, comprising: the liquid catalyst pressured spraying exhaust gas reducing system, the exhaust gas bypass pipe, and the high temperature plasma exhaust gas reducing device, and the three are linked to achieve the effect of: without replacing the catalytic converter, the catalyst carrier can easily remove accumulated dirt and the block on the through holes, reduce the resistance of the exhaust gas, increase the horsepower of the engine, etc., thereby improving the efficiency of the engine and reducing the exhaust gas, so as to achieve degrading pollutants, makes vehicles comply with environmental regulations, and saves maintenance costs.

6 Claims, 19 Drawing Sheets

DEVICE INCREASING ENGINE EFFICIENCY AND REDUCING EXHAUST AND NOISE

BACKGROUND OF THE INVENTION

1. Field of the Invention

The invention relates to an engine, especially the one who has a device increasing engine efficiency and reducing exhaust and noise.

2. Description of the Related Art

First, regardless of whether the engine uses gasoline, diesel oil or engine oil, lubricant, etc., due to structural factors, it is inevitable that incomplete combustion will occur, which will increase fuel consumption, reduce horsepower, and discharge too much toxic gas, causing serious environmental pollution, and failing to pass the vehicle inspection standards of the Department of Motor Vehicles. In addition, if the combustion process is often overheated, this will have a negative impact on the engine life.

Second, at present, the exhaust gas standards of automobiles and motorcycles are standardized. In order to reduce the air pollution of exhaust gas, most of the exhaust gas of automobiles and motorcycles needs to be purified before being discharged from the exhaust pipe. Generally, a three-way catalytic convertor is installed in the exhaust device. The conventional automotive catalytic converter device is showing in FIG. 1. Before the exhaust gas discharged from the engine 100 enters the muffler 104 through the engine exhaust gas outlet 101 and the exhaust gas pipe 102, it first passes through the catalytic converter 103 and then discharged from the rear end of the muffler 104. The general structure of the catalytic converter 103 is showing in FIG. 2A and FIG. 2B, the catalytic converter 103 is composed of a core catalytic element 1031 and a metal casing 1032. The core catalytic element 1031 usually contains a honeycomb support, which is rolled from a metal sheet or extruded by ceramics, is plated with aluminum oxide ($Al_2O_3$), platinum (Pt), palladium (Pd), rhodium (Rh), and other accelerators, etc.

Moreover, the CO and HC contained in the exhaust gas can be rapidly oxidized into harmless gases such as $CO_2$ and $H_2O$ after the exhaust gas discharged through the exhaust gas pipe 102 from the muffler 104 after being converted by the catalytic converter 103. However, one of the biggest drawbacks of catalytic converters is that they can only operate efficiently at high temperature, because the temperature at which the catalyst can fully preform its conversion effect generally needs to reach about 200° C. to 300° C. or more, and when the vehicle engine is running in a normal exhaust state, the temperature in the catalytic converter 103 can reach 500-800° C., so the catalyst can fully exert its purification effect. However, when the engine is initially started and is in a cold start state, the temperatures of the engine 100 and the catalytic converter 103 are quite low, and have not reached the catalytic conversion temperature at all, but at this time, the exhaust gas of the engine 100 also contains a large amount of carbon monoxide (CO) and hydrocarbons (HC), and the exhaust gas discharged from the exhaust gas pipe 102 contains carbon monoxide (CO) and hydrocarbons (HC) without being discharged from the catalytic converter; in this case, in addition to causing air pollution, it will also fail to meet the pollution standards stipulated by environmental protection regulations.

Also, a simple way to keep the catalytic converter at high temperature is to ensure that the converter is located upstream of the exhaust system and close to the engine. However, this method is inconvenient and may cause the catalytic converter to overheat and cause damage to the catalytic converter. Therefore, it is known to preheat the catalytic converter, which is usually accomplished using an electrical preheating element that heats the catalytic converter to operating temperature by the vehicle battery. During normal engine operation, the heat of the exhaust gas is usually sufficient to maintain the catalytic converter at its operating temperature, then the preheating element can be turned off. However, an electric preheater still requires several minutes to heat the catalyst to operating temperature. The preheater also cause a significant power drain on the battery and is not suitable for engines without batteries.

Another major operational problem with built-in catalytic converters is that the converter temperature will drop below a certain operating level when the engine is idling. For example, if the vehicle is in a traffic jam, or stopped at a red light, the engine speed will drop to idling speed. This can quickly drop the temperature of the exhaust gas to a level where it cannot properly maintain the catalytic converter within its operating temperature range. Therefore, it would be an advantage to provide some means of maintaining the catalytic converter within its operating temperature range for a longer period of time, especially when the engine speed is reduced (eg at idling)

Moreover, another problem with the conventional catalytic converter is that the catalyst carrier is easy to accumulate dirt, block the through holes, increase the resistance of the exhaust, reduce the horsepower of the engine, and even influence driving. The honeycomb supports rolled from metal sheets or extruded from ceramics are difficult to clean when the through holes are blocked, and sometimes the more they are cleaned, the more blocked they become. Therefore, it is often necessary to replace the entire core catalyst element 1031. However, the core catalyst element 1031 is plated with a lot of precious metals, so the price is expensive, especially for luxury cars, the price is even more expensive, and some are as high as tens of thousands of dollars.

The engine generates power by the combustion of fuel in the cylinder. Since the amount of fuel input is limited by the amount of air drawn into the cylinder, the power generated by the engine will also be limited. If the performance of the engine is already in the best state, and then the output power increasing can only be achieved by increasing the amount of fuel by compressing more air into the cylinder, thereby improving the power of the engine. The turbo system is one of the most common supercharging systems in supercharged engines. If more air and fuel mixture can be forced into the cylinder (combustion chamber) in the same unit time to do the compression and explosion action (Engines with small displacement can inhale the same amount of air as large displacement, so as to improve volumetric efficiency), and it can generate a greater power output than a naturally aspirated engine at the same engine speed. Generally, after the engine cooperates with such a "forced air intake" action, it can at least increase the extra power by 30%-40%. Such an amazing effect is the reason the turbocharger is so popular. Moreover, obtaining perfect combustion efficiency and greatly improving the power is the greatest value that the turbo system can provide to the vehicle. However, if the cooler the air enters the cylinder, the higher the combustion efficiency will be; and the higher the temperature of the exhaust gas, the better the effect on the catalytic converter will be.

Also, UV light sources, negative ion generators, ozone generators and other technological products have certain effects on the degradation and elimination of exhaust gas. Therefore, how to skillfully apply them to waste reduction of engines is also a subject that can be studied.

Also, when the engine is running, noise is generated in the engine room and inside the car compartment, and it is also an issue to be improved.

In view of the above-mentioned problems, the present invention is finally produced after the present inventor actively research and develop, and through many tests and corrections.

SUMMARY OF THE INVENTION

It is a primary objective of the present invention to provide a device increasing engine efficiency and reducing exhaust and noise, especially the one who can degrade and eliminate nitrogen oxides, hydrocarbons, carbon dioxide, carbon monoxide, smoke and smog generated by burning fuel in the engine, and improve combustion efficiency and energy saving.

It is another objective to provide a device for improving the efficiency of engine and reducing exhaust and noise.

In order to achieve the above objectives, the present invention comprise:

an engine, having at least one cylinder structure, the cylinder structure has an intake hole, an exhaust hole and a combustion chamber, a cooling water jacket arranged on the outer periphery, a piston arranged inside, and a driving element that drives the piston to reciprocate on the inner wall of the combustion chamber; an air intake device connected to the intake hole for feeding outside air, having an air intake pipe and an air intake box, and an air filter is arranged in the air intake box; an exhaust manifold connected to the exhaust hole, which is used to discharge the combustion exhaust gas that after passing through an exhaust gas discharge pipe, a catalytic converter and a muffler; and a motor unit connected on a belt driving device of the engine, and the motor unit is a double-acting device of power generator and motor; wherein:

I). A liquid catalyst pressured spraying exhaust gas reducing system arranged at the front end and rear end of the catalytic converter, including: a liquid catalyst, which is placed in a container and is composed of nano-platinum powder and promoter; a first conveying pipe connected from the bottom of the container to convey the liquid catalyst into the exhaust gas discharge pipe at the front end of the catalytic converter, the tail end of the first conveying pipe is provided with a first nozzle, and the first nozzle sprays the liquid catalyst against the front end of the catalytic converter; a pump arranged on the first conveying pipe to provide conveying power to the liquid catalyst in the first conveying pipe; a solenoid valve, arranged on the first conveying pipe and behind the pump; a computer, electrically connected to the pump and the solenoid valve; a second conveying pipe connected from the first conveying pipe to convey the liquid catalyst into the exhaust gas discharge pipe at the rear end of the catalytic converter, and the tail end of the second conveying pipe is provided with a second nozzle, and the second nozzle sprays the liquid catalyst backward; an exhaust gas bypass pipe, the front end of the exhaust gas bypass pipe is connected to the exhaust gas discharge pipe at the front end of the catalytic converter, and the rear end of the exhaust gas bypass pipe is connected to the exhaust gas discharge pipe at the rear end of the catalytic converter;

II). A high temperature plasma exhaust gas reducing device, which is arranged on the exhaust gas discharge pipe at the rear end of the catalytic converter and behind the second nozzle, and is arranged in a joint of a first connecting pipe and a second connecting pipe on the exhaust gas discharge pipe, including: an annular joint seat being made according to the diameter of the first connecting pipe and the second connecting pipe, so as to be combined between the first connecting pipe and the second connecting pipe; a secondary catalytic converter, which is a cup-shaped sintered metal sieve body, arranged on the front side of the annular joint seat, and the sintered metal sieve body contains embedded nano-gold and manganese materials; a ceramic base arranged on the rear side of the annular joint seat, and the ceramic base is provided with numerous axial flow holes for allowing the exhaust gas to pass through; a multi-pole plasma gun arranged on the ceramic base, there are at least two pairs of the multi-pole plasma gun which are symmetrically installed, and is electrically connected to an external high voltage generating circuit for generating high temperature plasma;

III). A noise reduction device, connected to the side of the air intake box, comprising: a resonance chamber connected to the side of the air intake box by a pipe body; a speaker, arranged in the resonance chamber; at least one microphone that uses a short-range wireless communications technology, such as BLUETOOTH®, including arranged in the air intake box, for capturing the internal noise of the engine and transmitting the noise signal; a noise analysis circuit, arranged in the resonance chamber and electrically connected to the speaker, the noise analysis circuit receives the noise signal sent by the BLUETOOTH® microphone, reproduces and emit sound waves with the same amplitude but inverted phase as the noise for cancelling the noise.

Also, wherein further includes a nano-platinum compound photocatalyst being added to the engine oil and the water tank to make the top surface of the piston, the inner wall of the cylinder structure and the cooling water jacket be coated with a nano-platinum layer, the nano-platinum compound photocatalyst is made of diethyl benzene, molybdenum disulfide and nano-ultrafine gold and nano-titanium with a concentration of 480-4800 ppm.

Also, wherein before the air filter in the air intake box having a UV light source, a negative ion generator and an ozone generator, and the nano-platinum compound photocatalyst is coated on the air filter and the inner side of the air intake box.

Also, wherein further includes a ultrasonic optical air intake vortex pipe, which is arranged on the air intake pipe, the ultrasonic optical air intake vortex pipe having an axial tube body and an accommodating chamber radially arranged in the middle section of the axial tube body, the inner wall of the axial tube body is provided with helical grooves which can turn the intake air into a spiral airflow and enter the combustion chamber of the engine to improve fuel air mixture, and the inner wall of the axial tube body is coated with nano-platinum compound photocatalyst, and having a UV light source which is used to catalyze the air moisture and decompose it into hydrogen and oxygen to improve combustion and reduce exhaust gas; the connection between the accommodation chamber and the axial tube body is provided with a variable frequency ultrasonic generator for outputting ultrasonic oscillations. The ultrasonic generator automatically generates variable frequency ultrasonic waves in correspondence with the engine speed, and further imparts ultrasonic energy to the intake air.

Also, wherein further includes a power storage device arranged at the position of the spare tire in the rear trunk of the car, the power storage device includes a tire, the inner edge of the tire having a flywheel, and the inner periphery of the flywheel is fixed with a permanent magnet; an armature core arranged in the flywheel and corresponded to the permanent magnet, the armature core is connected to the motor unit by a wire, and the generated electric power is stored by a battery set, thereby forming a magnetoelectric double-acting power storage device.

Also, wherein on the intake hole and the exhaust hole of the engine further include a turbocharger which is mainly composed of a compressor and a turbine, connected by a transmission shaft, the compressor is connected by a spiral tube with the air intake hole, the turbine is connected with the exhaust hole by a thermal insulation pipe, and the exhaust gas discharged by the engine impacts the turbine to run at a high speed, thereby driving the coaxial compressor rotate in the high-speed then forcing the pressurized air to be sent to the cylinder structure.

With the features disclosed above, the present invention uses the liquid catalyst pressured spraying exhaust gas reducing system, the exhaust gas bypass pipe, and the high temperature plasma exhaust gas reducing device, and the three are linked to achieve the effect of: without replacing the catalytic converter, the catalyst carrier can easily remove accumulated dirt and the block on the through holes, reduce the resistance of the exhaust gas, increase the horsepower of the engine, etc., thereby improving the efficiency of the engine and reducing the exhaust gas, so as to achieve degrading pollutants, makes vehicles comply with environmental regulations, and saves maintenance costs.

DETAILED DESCRIPTION OF THE PREFERRED EMBODIMENT

Figure 1:
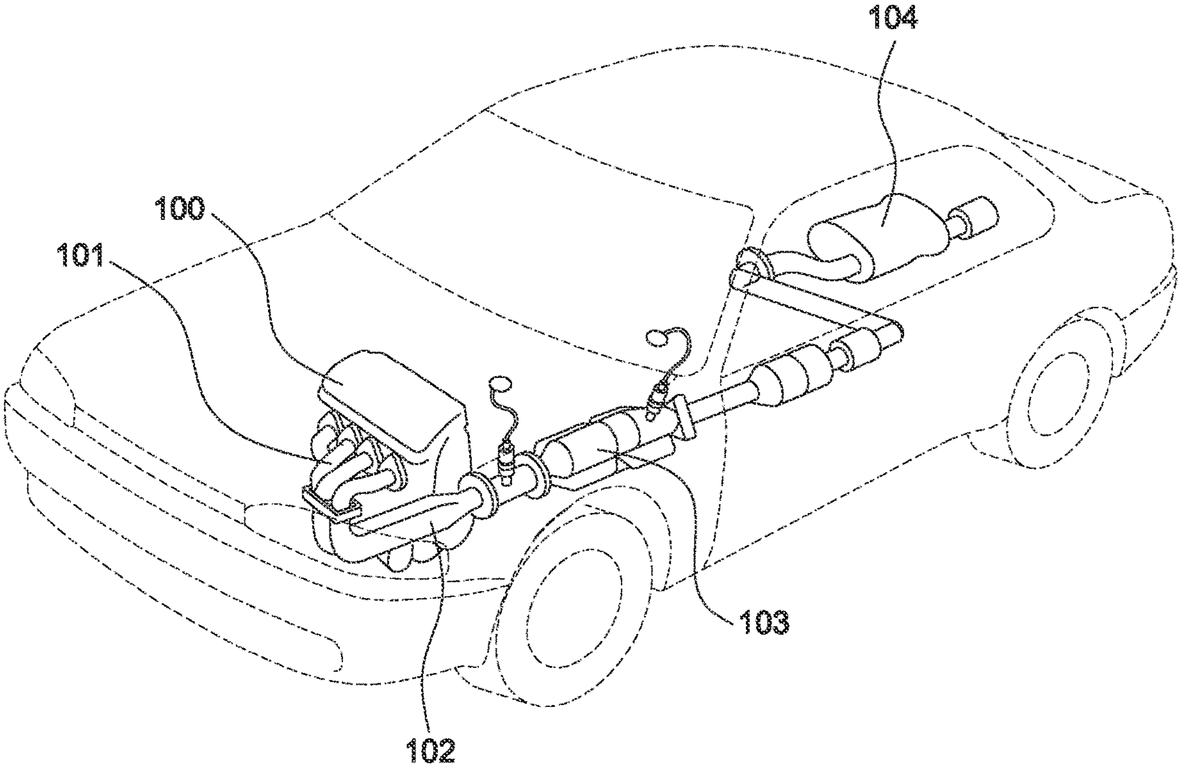
FIG.1 PRIOR ART
FIG. 1 is a schematic diagram illustrating the structure of the engine and the exhaust gas discharge system of the prior art.
Figure 2A:
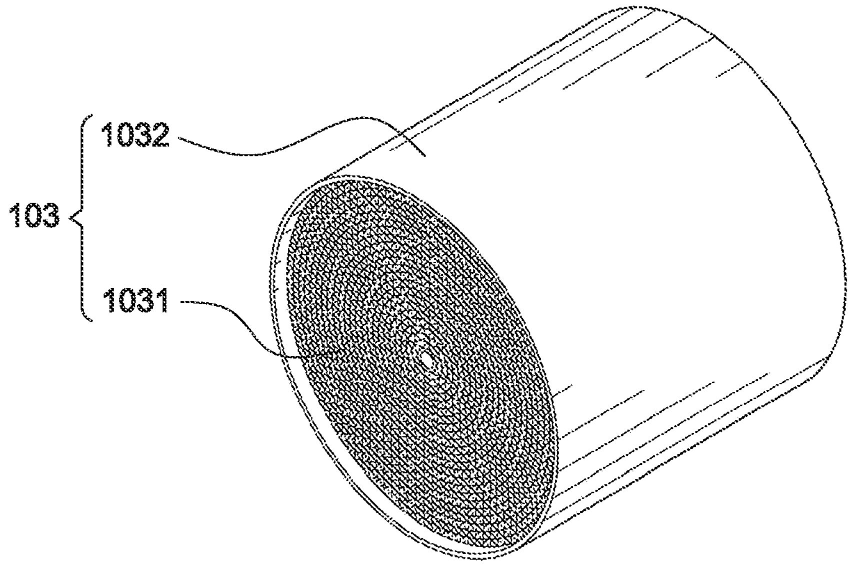
FIG.2A PRIOR ART
FIG. 2A is a perspective views of the catalytic converter of the prior art.
Figure 2B:
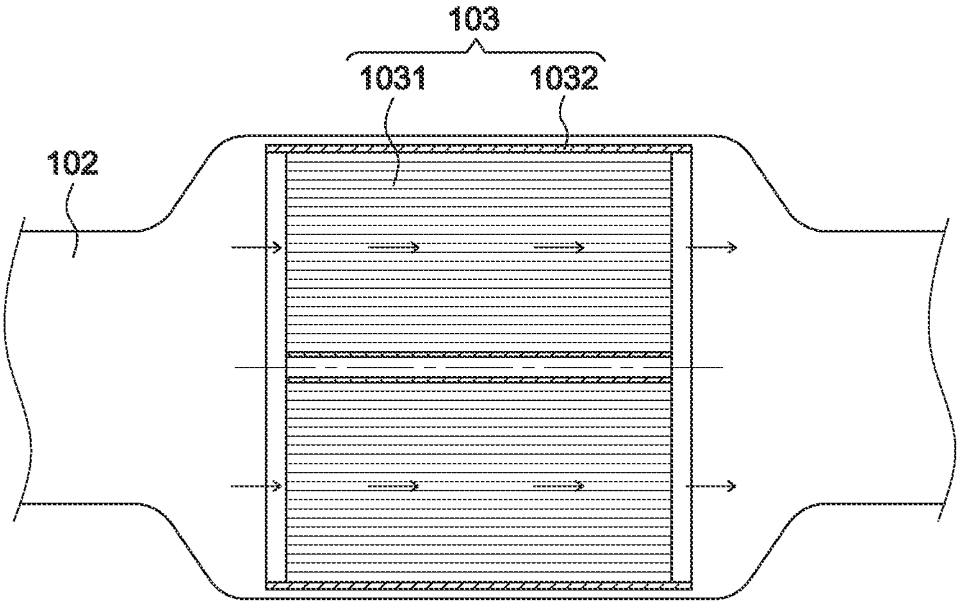
FIG.2B PRIOR ART
FIG. 2B is a sectional views of the catalytic converter in the exhaust gas discharge pipe of the prior art.
Figure 3:
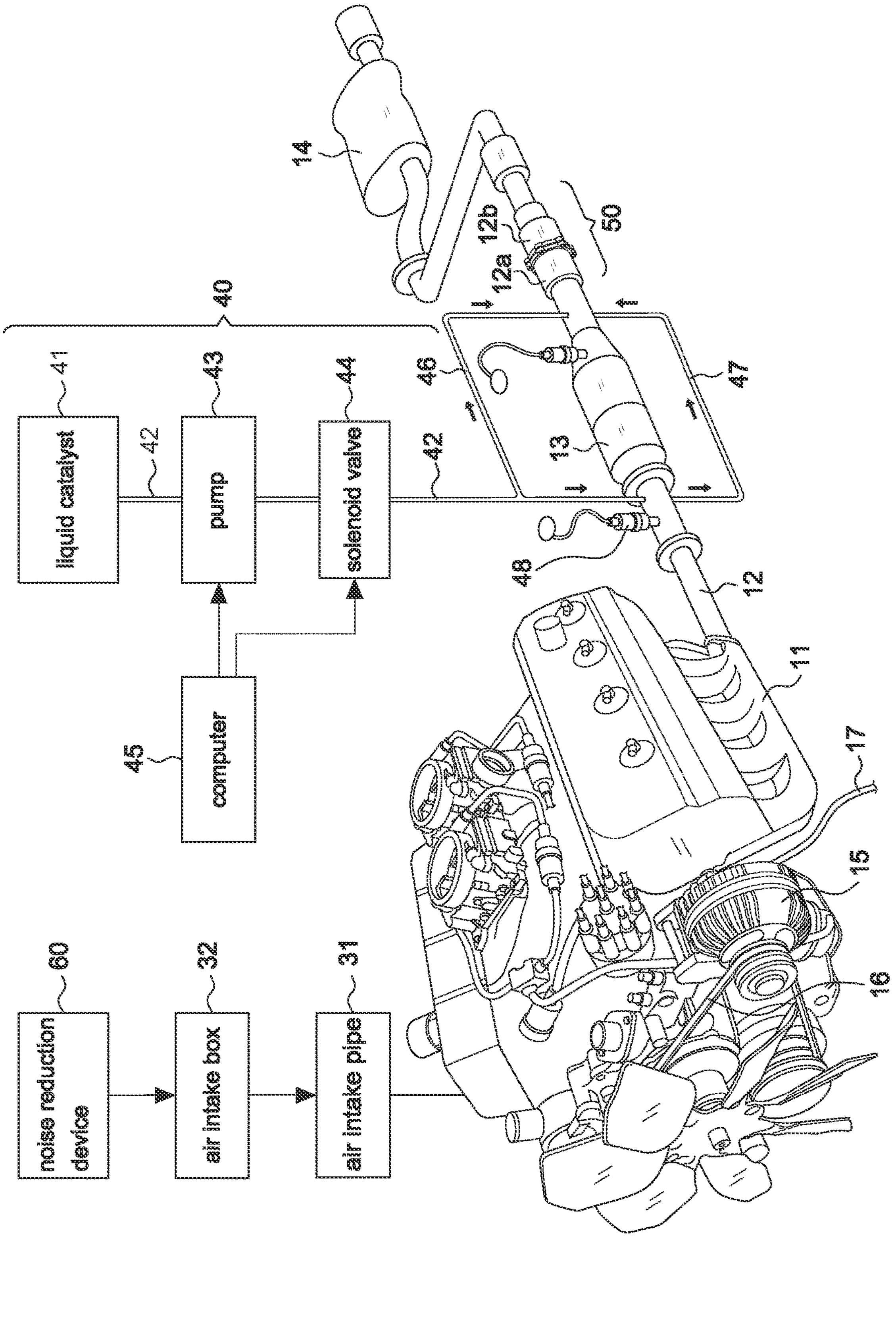
FIG. 3 is a schematic diagram illustrating the engine and the discharge of exhaust of an applicable embodiment of the present invention.

Referring to FIGS. 3-6, the present invention, including: an engine 10, having at least one cylinder structure 20, the cylinder structure 20 has an intake hole 21, an exhaust hole 22 and a combustion chamber 23, a cooling water jacket 24 arranged on the outer periphery, a piston 25 arranged inside, and a driving element 26 that drives the piston 25 to reciprocate on the inner wall of the combustion chamber 23; an air intake device 30 connected to the intake hole 21 for feeding outside air (A), having an air intake pipe 31 and an air intake box 32, and an air filter 321 is arranged in the air intake box 32.

An exhaust manifold 11 connected to the exhaust hole 22, which is used to discharge the combustion exhaust gas that after passing through an exhaust gas discharge pipe 12, a catalytic converter 13 and a muffler 14; and a motor unit 15 connected on a belt driving device 16 of the engine 10, and the motor unit 15 is a double-acting device of power generator and motor; when the oil tank sends gasoline or diesel oil into the engine 10 through the carburetor, it is ignited by the spark plug and burns in the combustion chamber 23 of the cylinder structure 20, and then pushes the piston 25 to act. However, the principle belongs to the prior art, and is not the subject of the patent of the present invention, so it will not be described in detail.

Figure 7A:
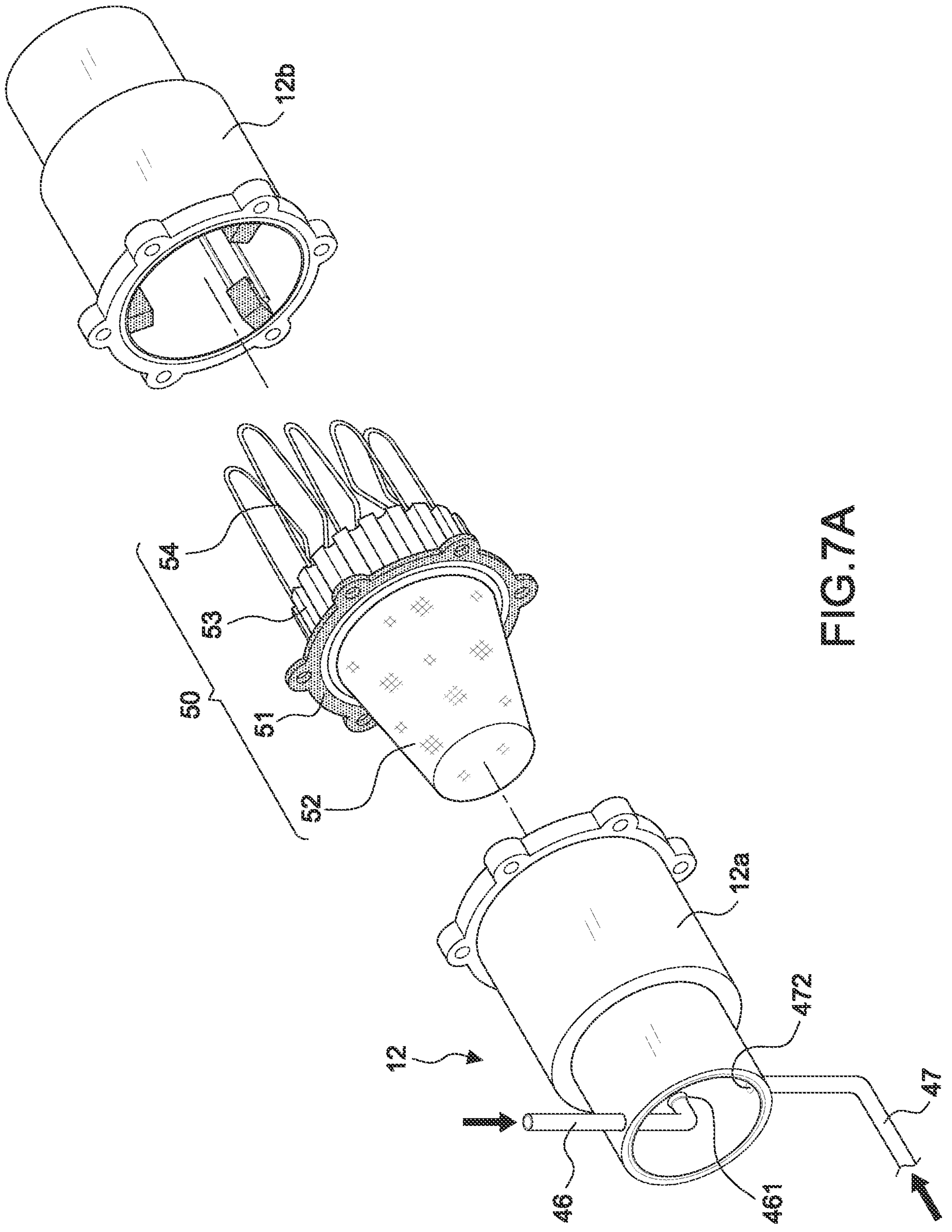
FIG. 7A is an exploded perspective views of the high temperature plasma exhaust gas reducing device of an applicable embodiment of the present invention.
Figure 7B:
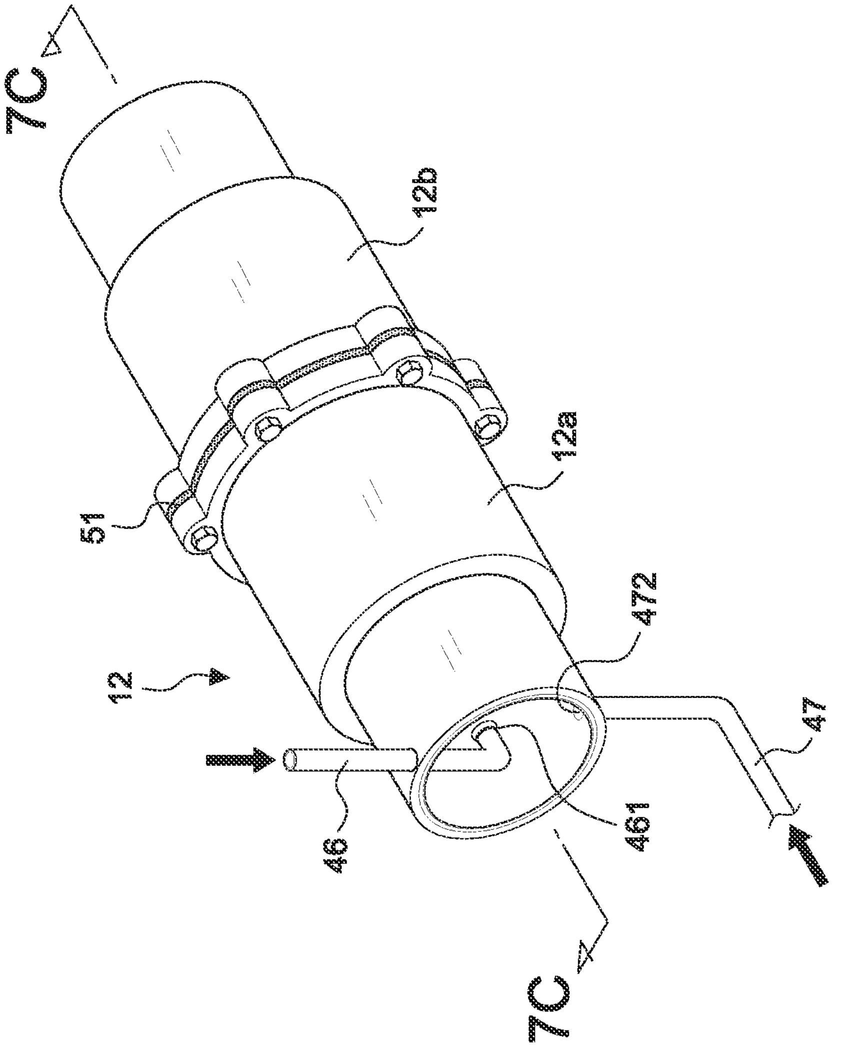
FIG. 7B is an assembly perspective views of the high temperature plasma exhaust gas reducing device of an applicable embodiment of the present invention.
Figure 7C:
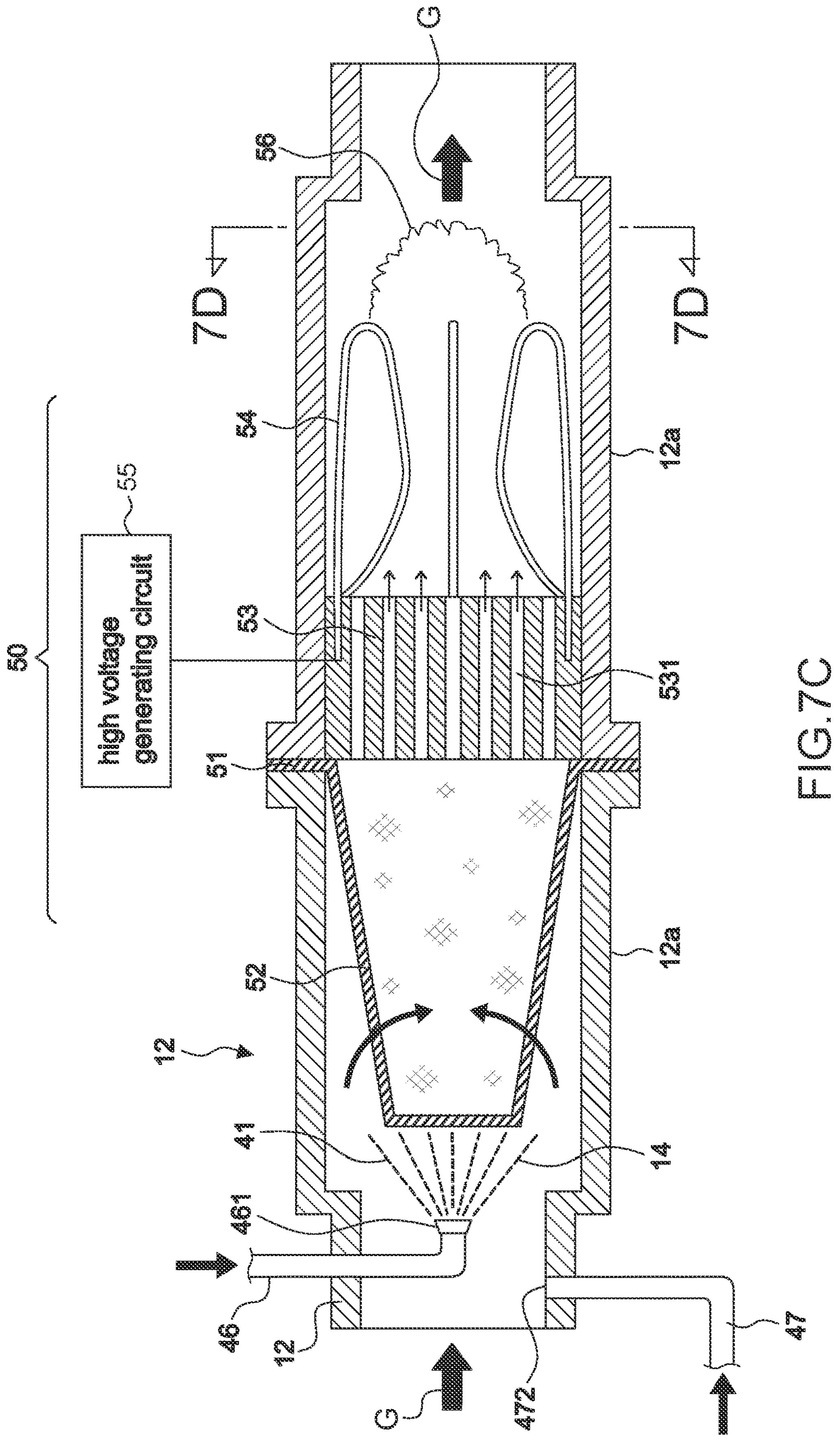
FIG. 7C is a sectional views of the high temperature plasma exhaust gas reducing device of an applicable embodiment of the present invention.
Figure 7D:
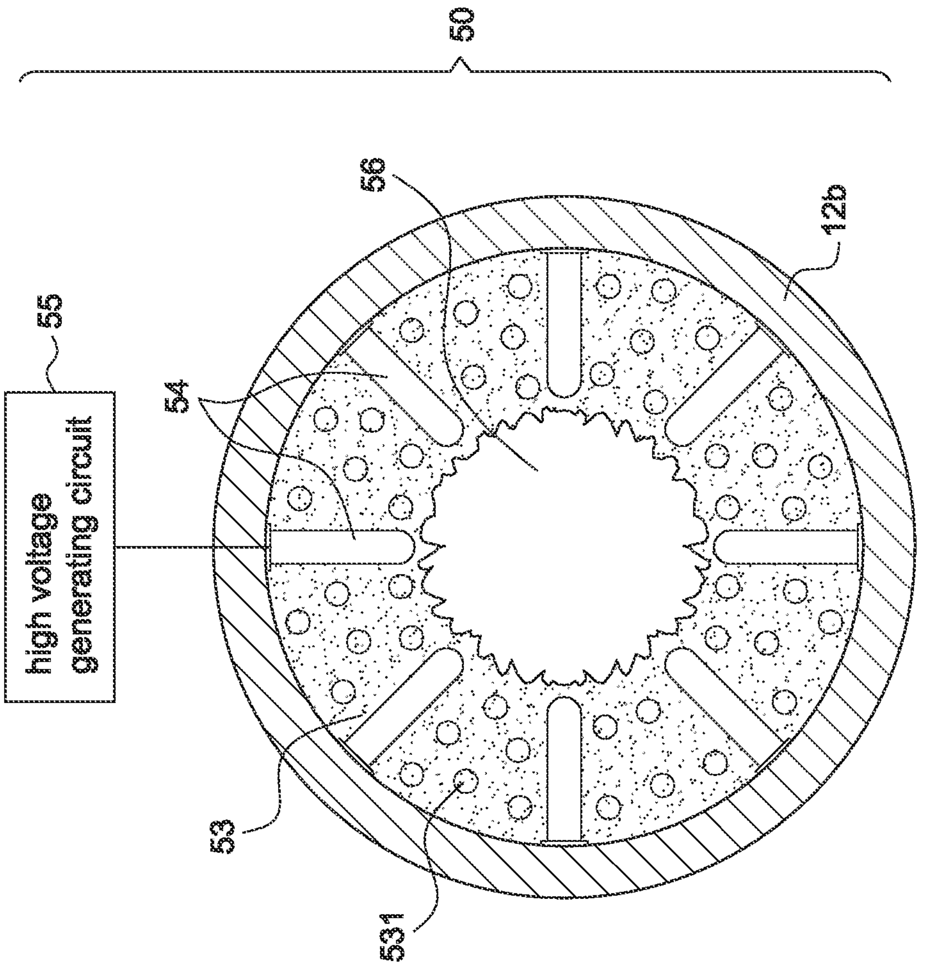
FIG. 7D is a sectional view along line 7D-7D in FIG. 7C.

The main feature of the present invention is: a liquid catalyst pressured spraying exhaust gas reducing system 40 arranged at the front end and rear end of the catalytic converter 13, including: a liquid catalyst 41, which is placed in a container 411 and is composed of nano-platinum powder and promoter; a first conveying pipe 42 connected from the bottom of the container 411 to convey the liquid catalyst 41 into the exhaust gas discharge pipe 12 at the front end of the catalytic converter 13, the tail end of the first conveying pipe 42 is provided with a first nozzle 421, and the first nozzle 421 sprays the liquid catalyst 41 against the front end of the catalytic converter 13; a pump 43 arranged on the first conveying pipe 42 to provide conveying power to the liquid catalyst 41 in the first conveying pipe 42; a solenoid valve 44, arranged on the first conveying pipe 42 and behind the pump 43; a computer 45, electrically connected to the pump 43 and the solenoid valve 44; a second conveying pipe 46 connected from the first conveying pipe 42 to convey the liquid catalyst 41 into the exhaust gas discharge pipe 12 at the rear end of the catalytic converter 13, and the tail end of the second conveying pipe 46 is provided with a second nozzle 461, and the second nozzle 461 sprays the liquid catalyst 41 backward, as FIGS. 7A-7C showing; an exhaust gas bypass pipe 47, the front end of the exhaust gas bypass pipe 47 is connected to the exhaust gas discharge pipe 12 at the front end of the catalytic converter 13, and the rear end of the exhaust gas bypass pipe 47 is connected to the exhaust gas discharge pipe 12 at the rear end of the catalytic converter 13; In this embodiment, the computer 45 is used to control the on and off of the pump 43 and the solenoid valve 44, and the computer 45 is electrically connected to an oxygen sensor 48.

Also, the liquid catalyst pressured spraying exhaust gas reducing system 40 sprays the liquid catalyst 41 against the front end of the catalytic converter 13 to eliminate carbon deposits and prevent the flow holes 131 of the honeycomb carrier of the catalytic converter 13 from being blocked.

Referring to FIGS. 7A-7D, the present invention includes a high temperature plasma exhaust gas reducing device 50, which is arranged on the exhaust gas discharge pipe 12 at the rear end of the catalytic converter 13 and behind the second nozzle 461, and is arranged in a joint of a first connecting pipe 12*a* and a second connecting pipe 12*b* on the exhaust gas discharge pipe 12, including: an annular joint seat 51 being made according to the diameter of the first connecting pipe 12*a* and the second connecting pipe 12*b*, so as to be combined between the first connecting pipe 12*a* and the second connecting pipe 12*b*; a secondary catalytic converter 52, which is a cup-shaped sintered metal sieve body, arranged on the front side of the annular joint seat 51, and the sintered metal sieve body contains embedded nano-gold and manganese materials; a ceramic base 53 arranged on the rear side of the annular joint seat 51, and the ceramic base 53 is provided with numerous axial flow holes 531 for allowing the exhaust gas (G) to pass through; a multi-pole plasma gun 54 arranged on the ceramic base 53, there are at least two pairs of the multi-pole plasma gun 54 which are symmetrically installed, and is electrically connected to an external high voltage generating circuit 55 for generating high temperature plasma 56.

Also, the present invention further having a secondary catalytic converter 52 the exhaust gas discharge pipe 12 at the rear end of the catalytic converter 13 to form a pattern of two catalytic converters that one at the front end and the other at the rear end, so that CO and HC contained in the exhaust gas (G) can be rapidly oxidized into harmless gas such as $CO_2$ and $H_2O$. Moreover, as showing in FIG. 7C, the present invention uses the second nozzle 461 to spray the liquid catalyst 41 on the front end of the secondary catalytic converter 52 to eliminate carbon deposits and prevent the sintered metal sieve body of the secondary catalytic converter 52 from being blocked. Furthermore, the present invention uses the exhaust gas bypass pipe 47 to guide the excess exhaust gas (G) blocked in the catalytic converter 13 to the front end surface of the secondary catalytic converter 52 to spray the liquid catalyst 41, so that the catalytic converter 13 can be prevented from blocking due to excessive exhaust gas (G) in front of it.

Then, the present invention further uses the high temperature plasma 56 generated by the high temperature plasma exhaust gas reducing device 50, the temperature can be from room temperature to tens of thousands of degrees Celsius, and it can almost eliminate all toxic active gases by redox reaction; moreover, when the high-voltage electrode of the high temperature plasma 56 breaks down the air, ozone will be generated. Ozone can also oxidize and reduce almost all active harmful gases, and will generate UV rays which can also oxidize or reduce harmful gases. In this embodiment, the multi-pole plasma gun 54 not only generates plasma temperature, but also degrades the exhaust gas (G), and also generates "ultraviolet rays" to convert and degrade the exhaust gas (G). The multi-pole plasma gun 54 of the present invention is the fourth state of matter following the solid state, liquid state, and gas state. When the applied voltage reaches the ignition voltage of the gas, the gas molecules are broken down, resulting in mixture of electrons, various ions, atoms and free radicals. Although the electron temperature is high during the discharge process, the heavy particle temperature is very low, and the whole system is in a low temperature state, so it is called low temperature plasma. The degradation of pollutants by low-temperature plasma is to use these high-energy electrons, free radicals and other active particles o decompose the pollutant molecules in the exhaust gas in a very short period of time, and undergo various subsequent reactions to achieve the degradation of pollutants.

With the features disclosed above, the present invention uses the liquid catalyst pressured spraying exhaust gas reducing system 40, the exhaust gas bypass pipe 47, and the high temperature plasma exhaust gas reducing device 50, and the three are linked to achieve the effect of: without replacing the catalytic converter 13, the catalyst carrier can easily remove accumulated dirt and the block on the through holes, reduce the resistance of the exhaust gas, increase the horsepower of the engine, etc., thereby improving the efficiency of the engine and reducing the exhaust gas, so as to achieve degrading pollutants, makes vehicles comply with environmental regulations, and saves maintenance costs.

Figure 4:
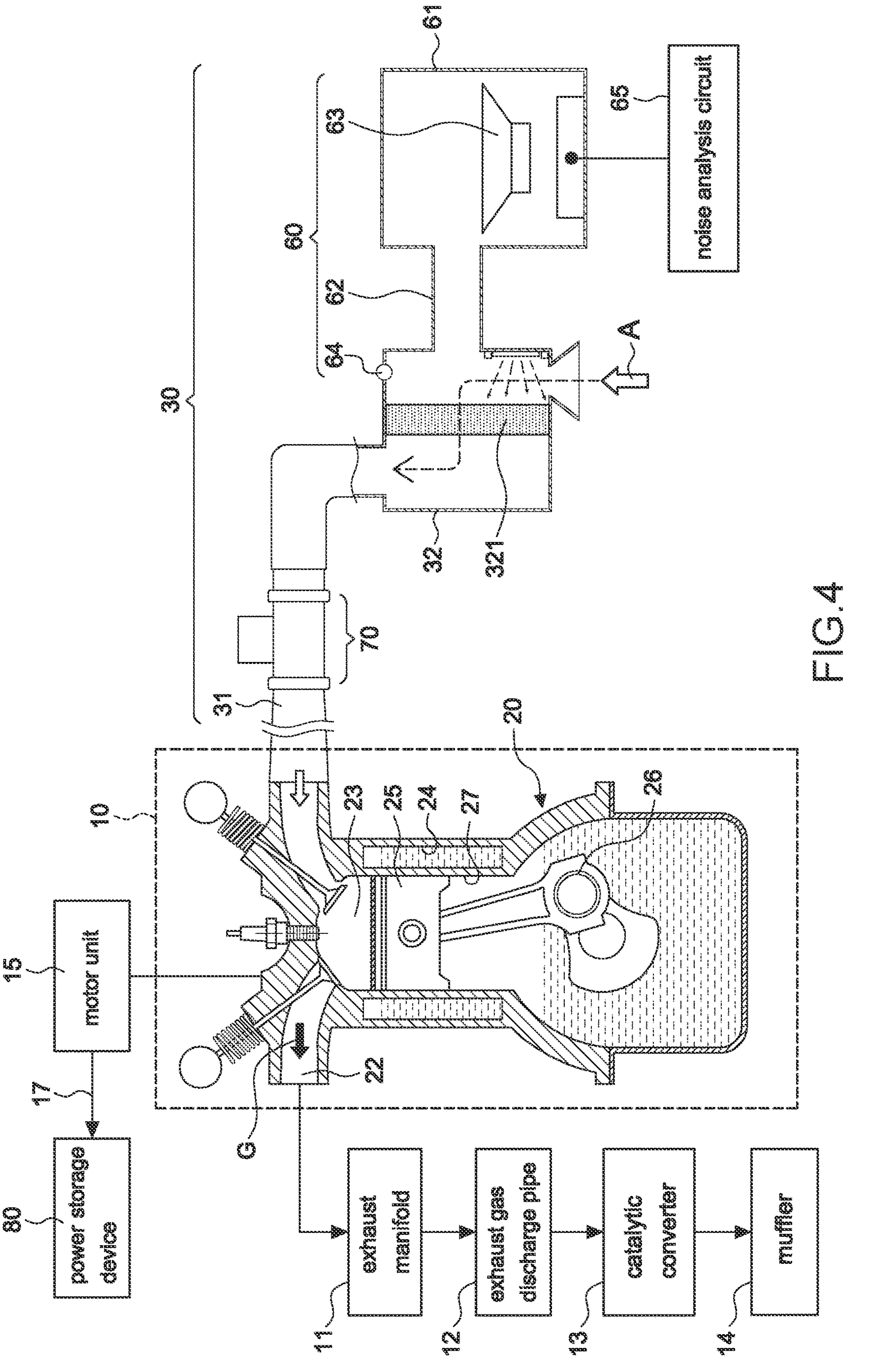
FIG. 4 is a schematic diagram illustrating the engine and the air intake system of an applicable embodiment of the present invention.
Figure 5:
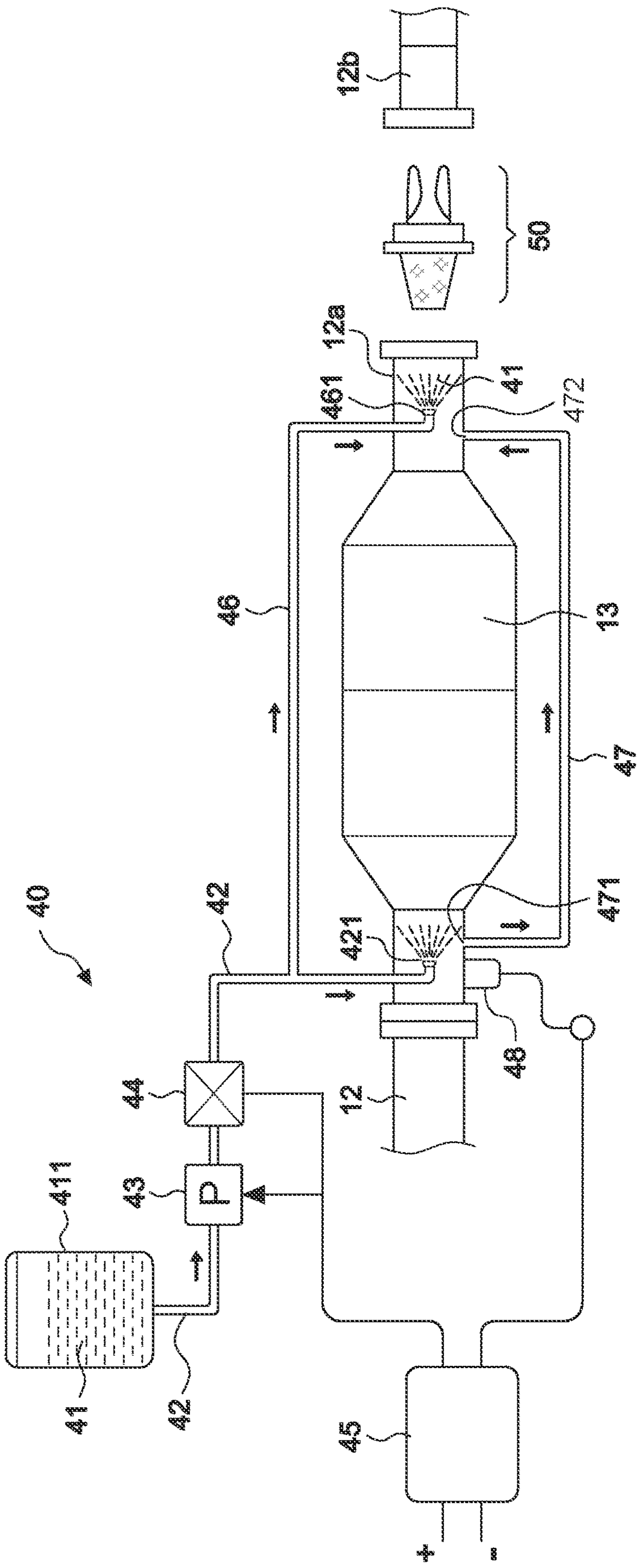
FIG. 5 is a schematic diagram illustrating the liquid catalyst pressured spraying exhaust gas reducing system of an applicable embodiment of the present invention.
Figure 6:
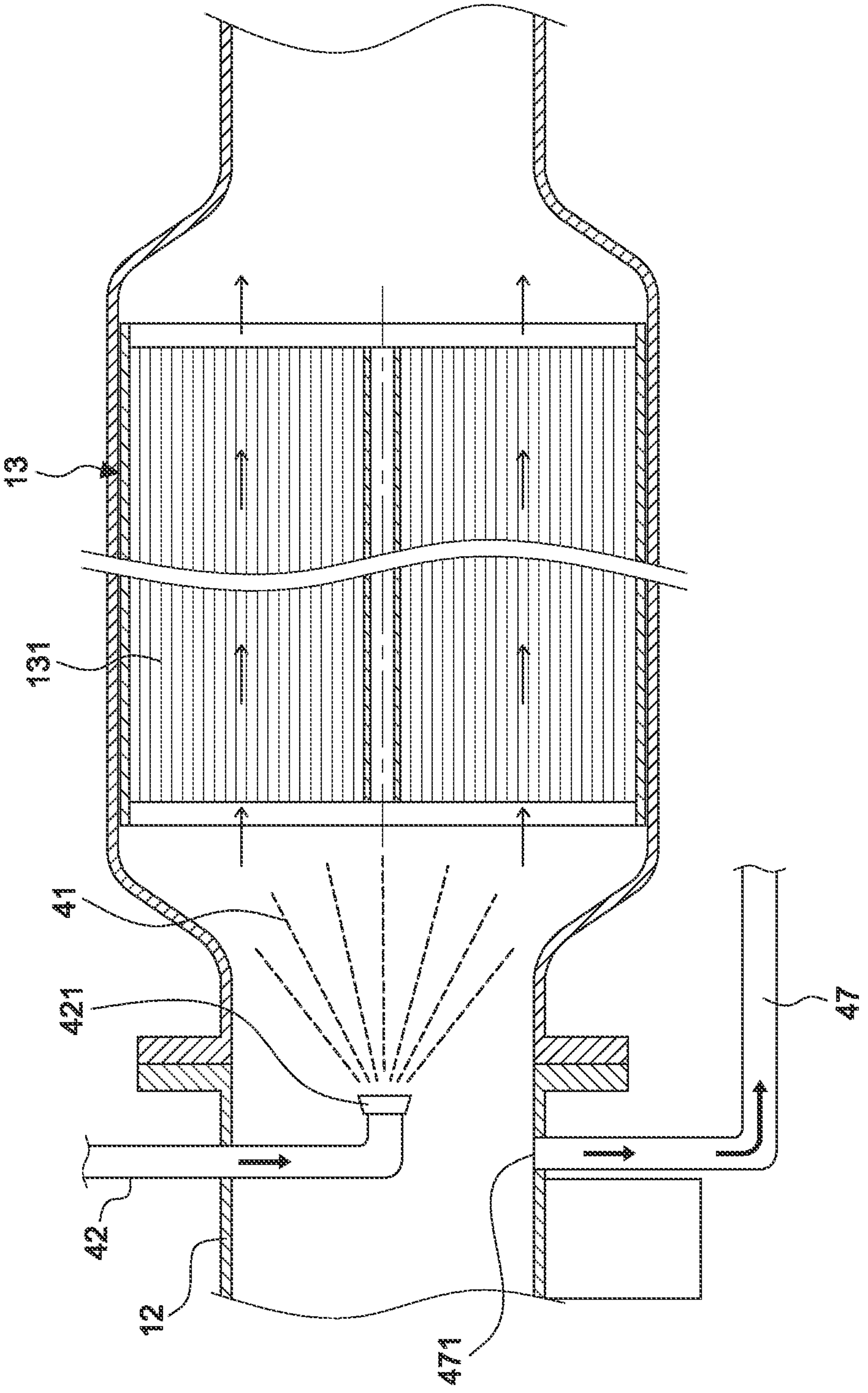
FIG. 6 is a sectional views of a part of the liquid catalyst pressured spraying exhaust gas reducing system of an applicable embodiment of the present invention.
Figure 8A:
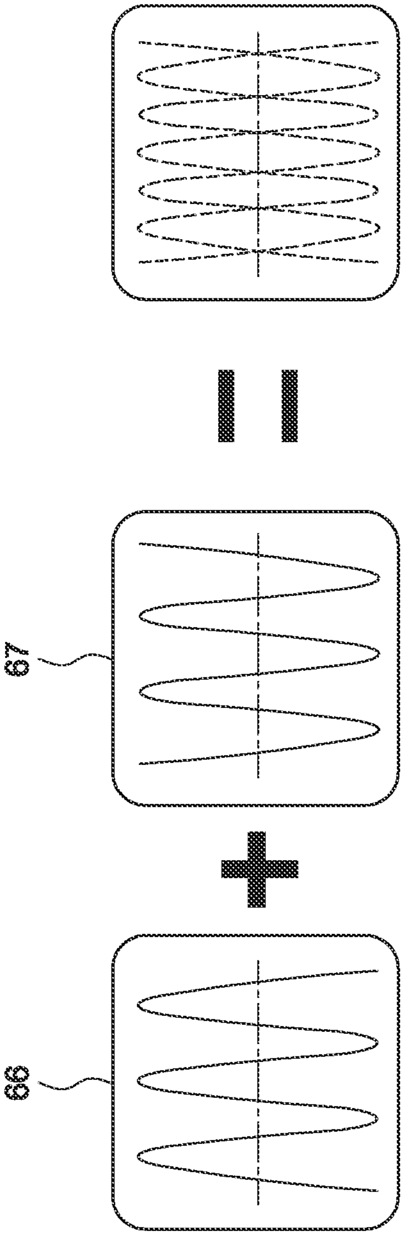
FIG. 8A is a schematic diagram illustrating the noise reduction device of the present invention emitting sound with the same amplitude but inverted phase as the noise for cancelling the noise.
Figure 8B:
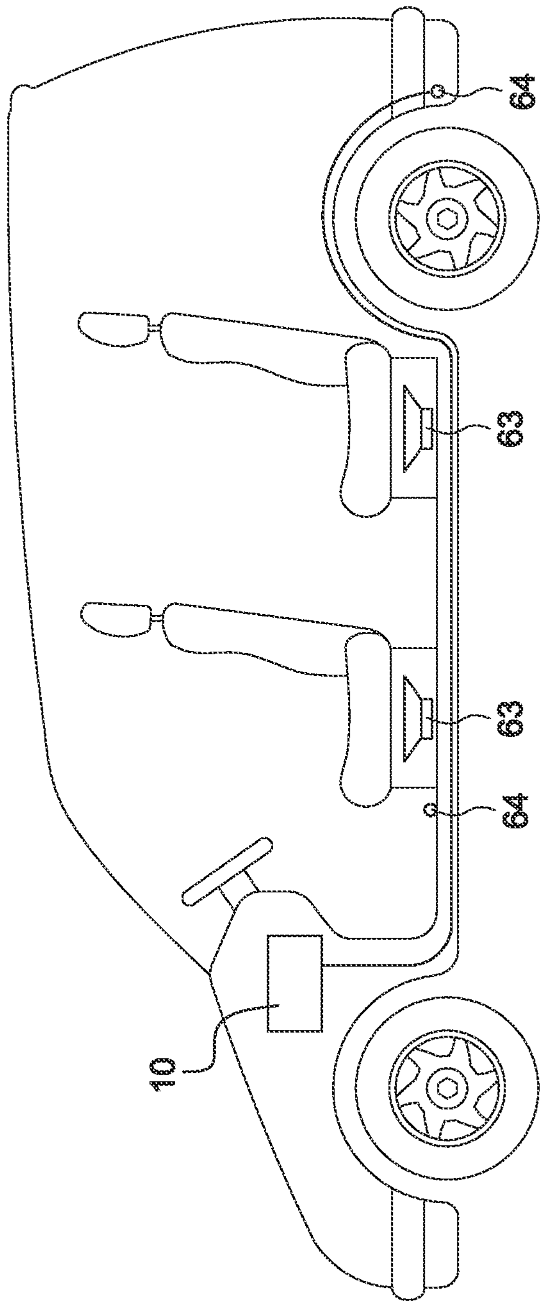
FIG. 8B is a schematic diagram illustrating the noise reduction device of an applicable embodiment of the present invention.

As FIG. 4, FIG. 8A, FIG. 8B, the present invention further include a noise reduction device 60, connected to the side of the air intake box 32, comprising: a resonance chamber 61 connected to the side of the air intake box 32 by a pipe body 62; a speaker 63, arranged in the resonance chamber 61; at least one BLUETOOTH® microphone 64, including arranged in the air intake box 32, for capturing the internal noise of the engine 10 and transmitting the noise signal; a noise analysis circuit 65, arranged in the resonance chamber 61 and electrically connected to the speaker 63, the noise analysis circuit 65 receives the noise signal sent by the BLUETOOTH® microphone 64, reproduces and emit sound waves with the same amplitude but inverted phase as the noise for cancelling the noise.

Also, the principle used by the noise reduction device 60 is: sound waves are generated by vibration and propagate through the surrounding medium, and the most common medium is air. The method of the present invention to cancel noise is to use the uniqueness of sound waves and media to operate to create sound waves with the same amplitude but inverted phase as the noise and prevent it from entering the ear. The BLUETOOTH® microphone 64 is used to capture the internal noise 66 of the engine 10, and the noise analysis circuit 65 performs real-time calculation, then emit sound waves 67 with the same amplitude but inverted phase as the noise for cancelling the noise through the speaker 63, as FIG. 8A showing. The BLUETOOTH® microphone 64 is not limited to be set in the air intake box 32, as FIG. 8B showing, it can be arranged in any appropriate position in the car compartment, and has the effect of reducing the noise of the car compartment, which will not be described in detail.

Figure 9A:
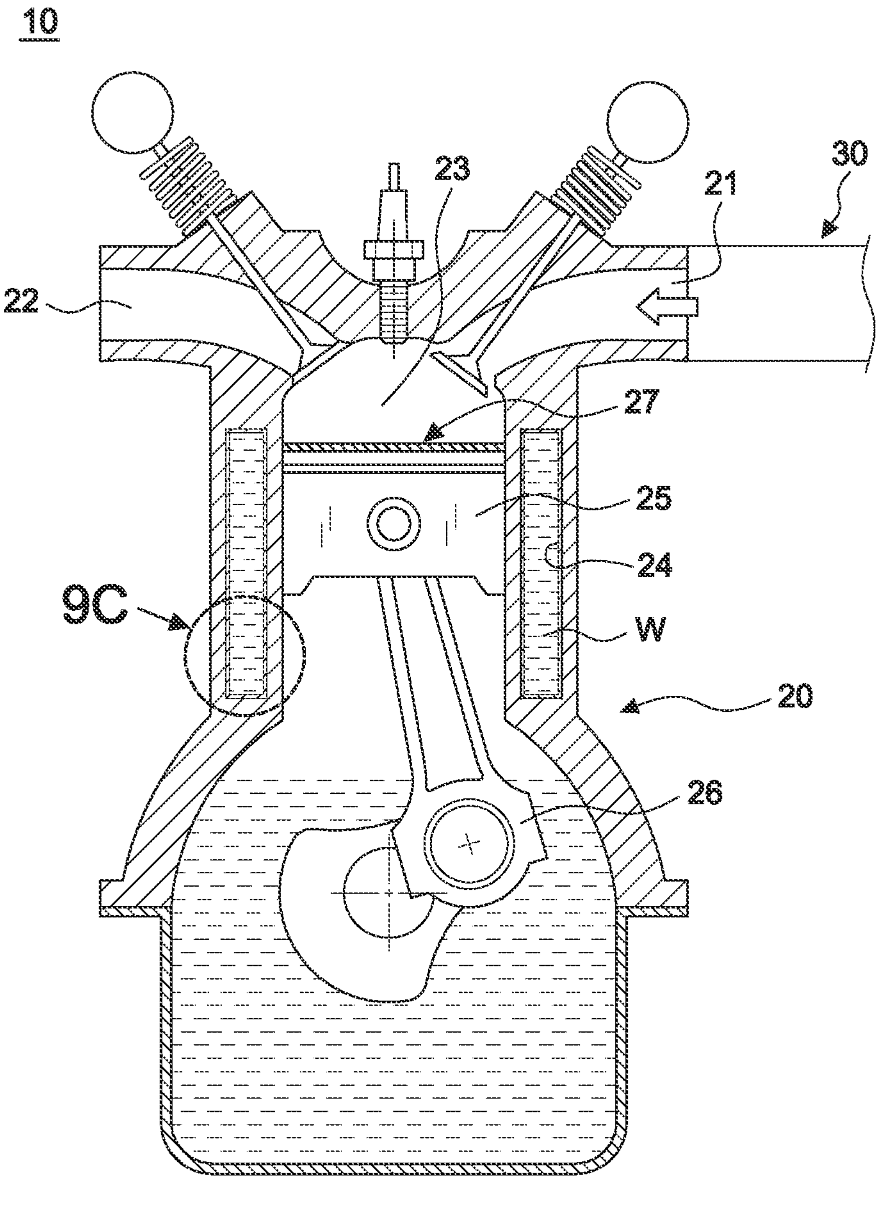
FIG. 9A is a sectional views of the structure of the engine of the present invention.
Figure 9B:
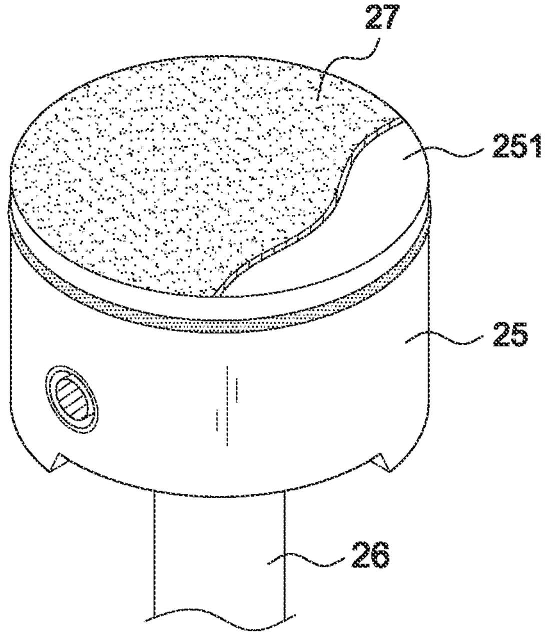
FIG. 9B is a schematic diagram illustrating the structure of the piston of the present invention.
Figure 9C:
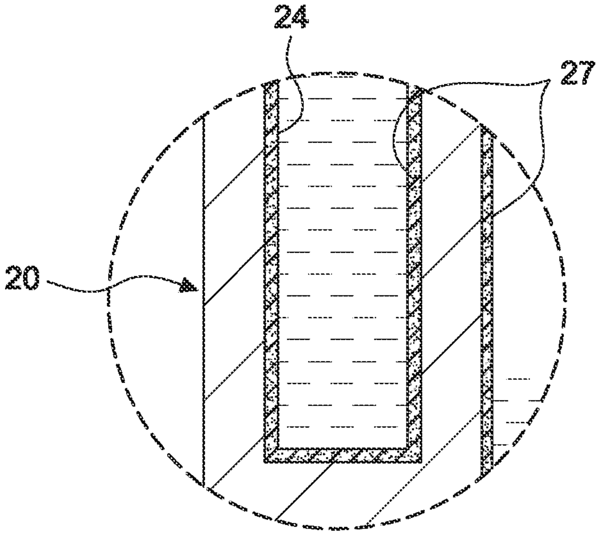
FIG. 9C is zoom in of the 9C in FIG. 9A.

Referring to FIGS. 9A-9C, the present invention further includes a nano-platinum compound photocatalyst being added to the engine oil and the water tank to make the top surface of the piston 25, the inner wall of the cylinder structure 20 and the cooling water jacket 24 be coated with a nano-platinum layer 27, the nano-platinum compound photocatalyst is made of diethyl benzene, molybdenum disulfide and nano-ultrafine gold and nano-titanium with a concentration of 480-4800 ppm; in this embodiment, the liquid heat dissipation material of the nano-platinum compound photocatalyst is added to the water tank and the fuel tank, and enters the engine 10 together with oil such as gasoline and diesel through the carburetor to burn, thereby reducing the temperature at which nitrogen and oxygen form nitrogen oxides; the high pressure and high temperature of the engine 10 is suitable for catalyst, since Nano Platinum and Nano Au are nano-scale metal powders, the nanoparticles have a large surface area and a large active center, they are excellent heat transfer medium, which can improve the heat dissipation effect of the engine. Therefore, the nano-platinum compound photocatalyst has a special surface effect, which can catalyze the CO oxidation reaction with excellent activity, rapidly convert CO into $CO_2$, and reduce NOx to $N_2$, at the same time, its special thermodynamic properties also lower the melting point of nano-metals, effectively reducing its sintering temperature. Therefore, when the nano-platinum compound photocatalyst enters the engine 10, it has the functions of catalyzing various chemical reactions and reducing the temperature of the engine. Further, nano-titanium liquid is mainly composed of titanium dioxide ($TiO_2$) and water, and titanium dioxide itself is a catalyst, which can reduce the required energy of chemical reaction and then promote chemical reaction, thus, it must be used in combination with nano-ultrafine gold to achieve better effects. As FIG. 9B and FIG. 9C showing, after the nano-platinum compound photocatalyst of the present invention enters the engine 10, a nano-platinum layer 27 is gradually formed a nano-platinum layer 27 on the piston top surface 251, the inner wall of the cylinder structure 20 and the cooling water jacket 24, it can not only protect the piston 25 and the cylinder structure 20, but also provide a catalytic effect on combustion, so as to improve the output efficiency of the engine 10, reduce toxic exhaust gas, and increase the service life.

Figure 10A:
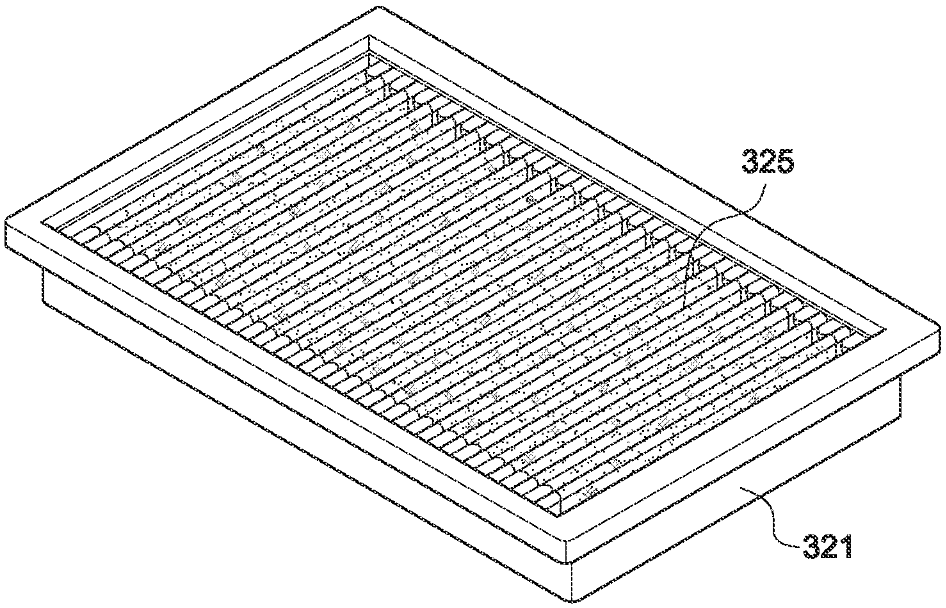
FIG. 10A is a perspective views of the structure of the air filter of the present invention.
Figure 10B:
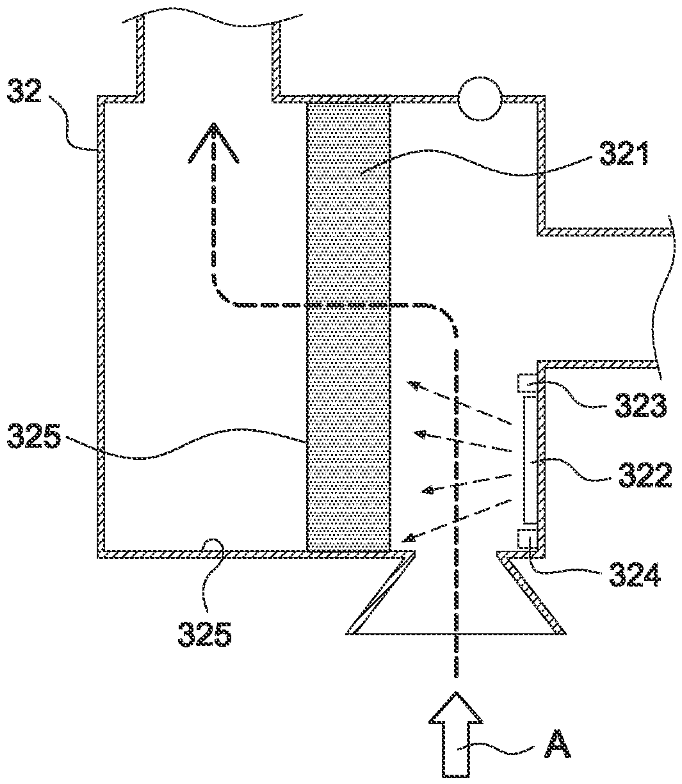
FIG. 10B is a sectional views of the air intake box of the present invention.

Referring to FIGS. 10A-10B, before the air filter 321 in the air intake box 32 having a UV light source 322, a negative ion generator 323 and an ozone generator 324, and the nano-platinum compound photocatalyst 325 is coated on the air filter 321 and the inner side of the air intake box 32. Deodorization principle of ozone generator 324: Ozone has a very strong oxidizing ability, and its redox potential is second only to fluorine, in its application, this characteristic is mainly used to quickly decompose substances that produce odor and other odors, such as amine, hydrogen sulfide, methyl thiol, etc., are oxidized and decomposed by ozone to generate non-toxic and odorless small molecular substances. In addition, since part of the exhaust gas contains a small amount or even a large amount of dust particles, and the non-selective reaction of ozone in the exhaust gas with dust is too large (because ozone will react with particulate matter at the same time), in the process of ozone decomposing exhaust gas odor, the first step is dust removal. In this embodiment, the nano-platinum compound photocatalyst 325 is coated on the air filter 321 and inner side of the air intake box 32, which has the effect of removing dust and odor of exhaust gas.

Figure 11A:
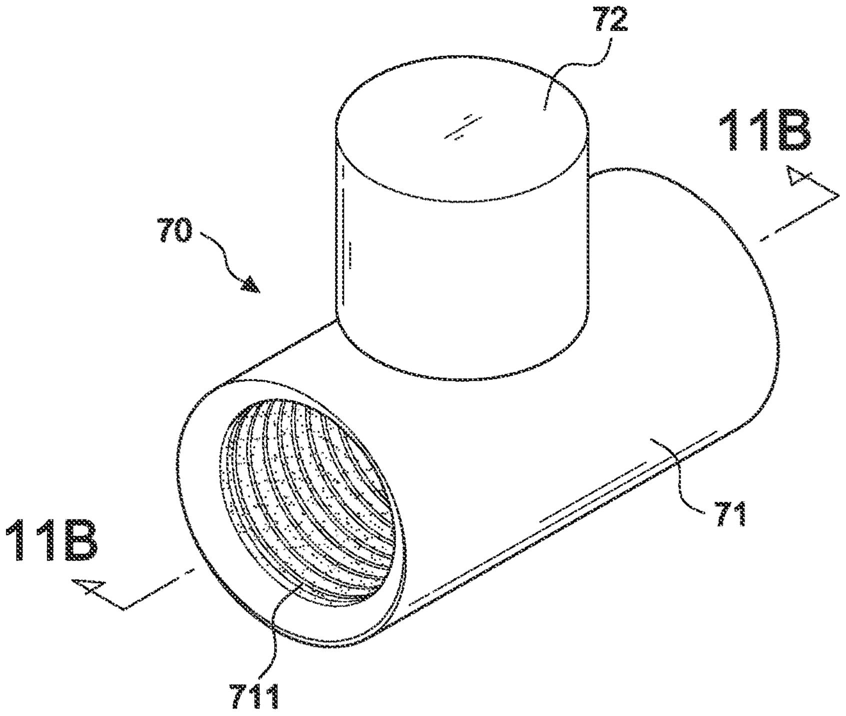
FIG. 11A is a perspective views of the structure of the ultrasonic optical air intake vortex pipe of the present invention.
Figure 11B:
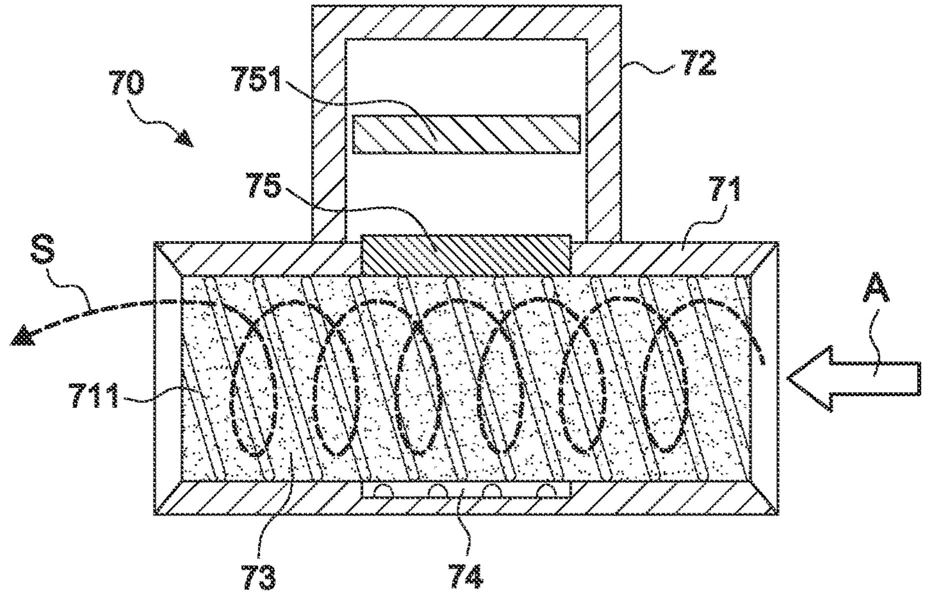
FIG. 11B is a sectional views of the structure of the ultrasonic optical air intake vortex pipe of the present invention.

Referring to FIGS. 11A~11B, the present invention further includes a ultrasonic optical air intake vortex pipe 70, which is arranged on the air intake pipe 31, the supersonic ultrasonic optical air intake vortex pipe 70 having an axial tube body 71 and an accommodating chamber 72 radially arranged in the middle section of the axial tube body 71, the inner wall of the axial tube body 71 is provided with helical grooves 711 which can turn the intake air A into a spiral airflow S and enter the combustion chamber 23 of the engine 10 to improve fuel air mixture, and the inner wall of the axial tube body 71 is coated with nano-platinum compound photocatalyst 73, and having a UV light source 74 which is used to catalyze the air moisture and decompose it into hydrogen and oxygen to improve combustion and reduce exhaust gas; the connection between the accommodation chamber 72 and the axial tube body 71 is provided with an a variable frequency ultrasonic generator 75 for outputting ultrasonic oscillations. The ultrasonic generator 75 automatically generates variable frequency ultrasonic waves in correspondence with the engine speed, and further imparts ultrasonic energy to the intake air.

Figure 12A:
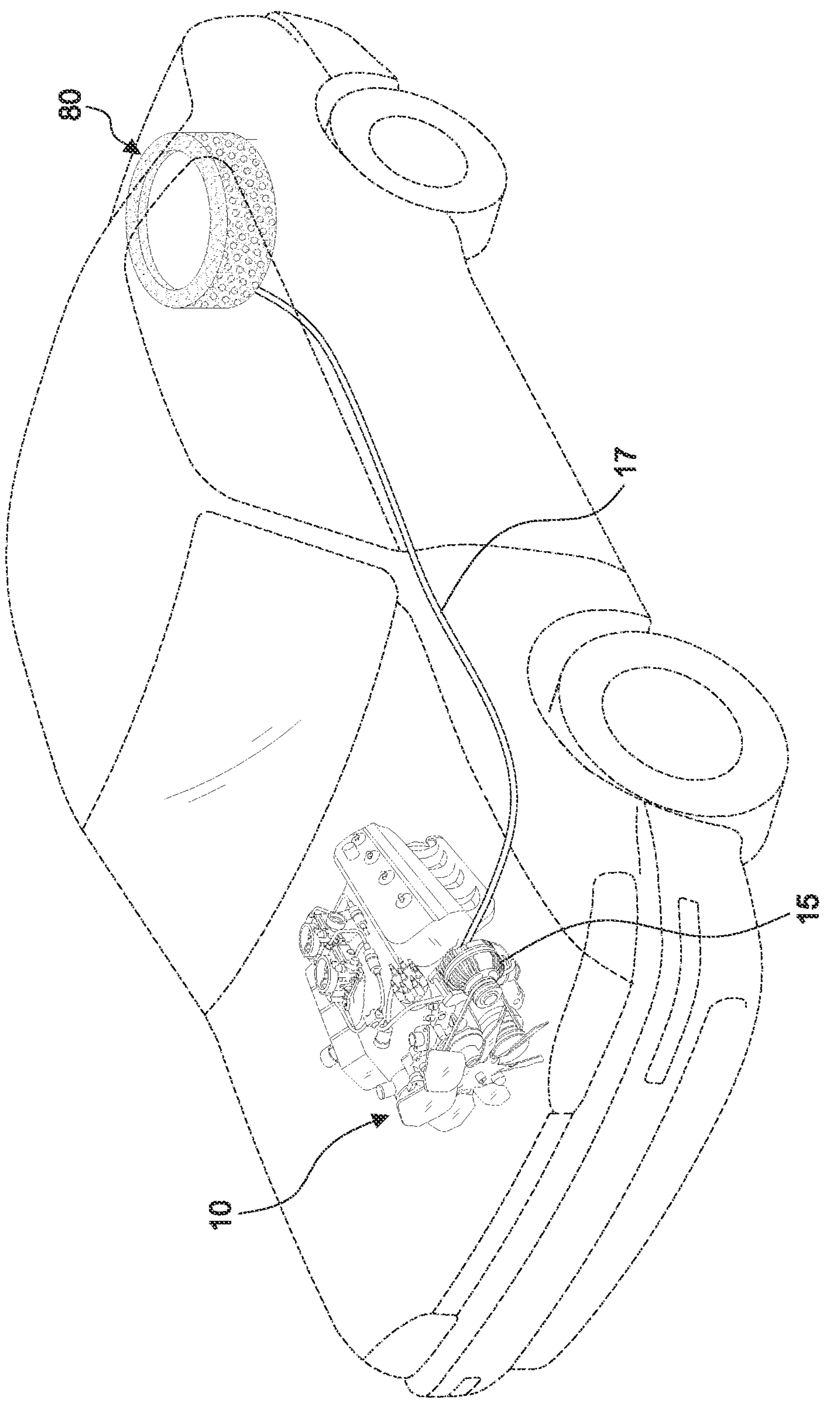
FIG. 12A is a schematic diagram illustrating the arrangement of the power storage device of the present invention.
Figure 12B:
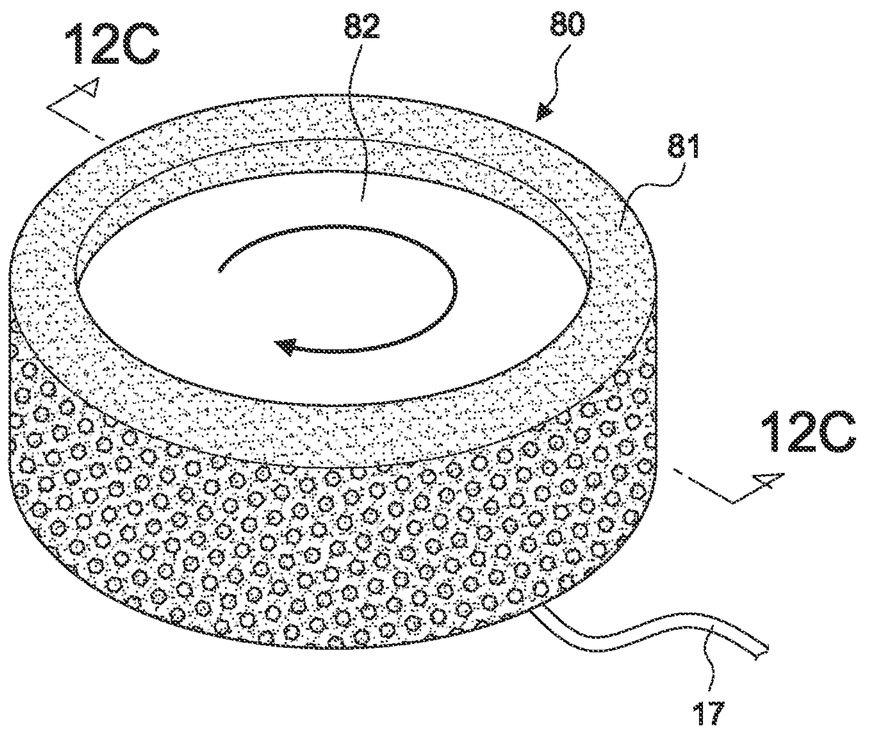
FIG. 12B is a perspective views of the power storage device of the present invention.
Figure 12C:
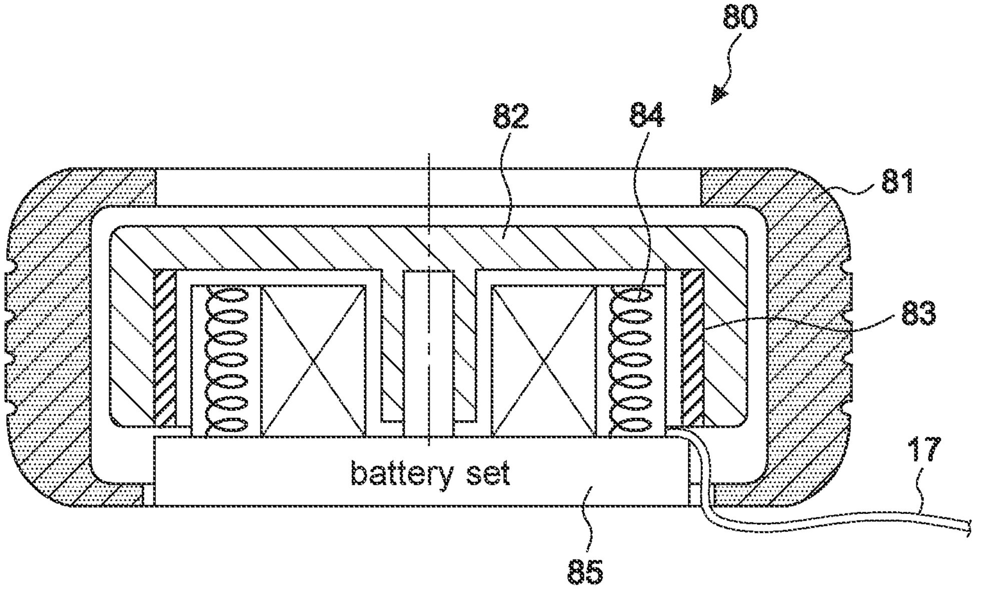
FIG. 12C is a sectional view along line 12C-12C in FIG. 12B.

Referring to FIGS. 12A-12C, further includes a power storage device 80 arranged at the predetermined position in the car, the power storage device 80 includes a tire 81, the inner edge of the tire 81 having a flywheel 82, and the inner periphery of the flywheel 82 is fixed with a permanent magnet 83; an armature core 84 arranged in the flywheel 82 and corresponded to the permanent magnet 83, the armature core 84 is connected to the motor unit 13 by a wire 17, he permanent magnet 83 rotates with the flywheel 82 and forms a magnetic circuit relative to the armature core 84, so that the coils on the armature core 84 generate electricity. This is the principle of a permanent magnet generator and will not described in detailed. The present invention uses this principle to use the flywheel 82 as a power source for generating electricity, so that the armature core 84 generates electricity, and the generated electric power is stored by a battery set 85, thereby forming a magnetoelectric double-acting power storage device. In this embodiment, the charging and discharging power source of the power storage device 80 is connected to the motor unit 15 (generator and motor combined dual-motor type), and convert excess power of the engine 10 while idling, braking, and descending a slope into the inertia of the flywheel 82 to charge slowly, then slowly stored in the battery set 85, when a sudden acceleration or starting vehicle is required, such as when the electric motor assists the engine 10 to start or accelerate or overtake, the magnet electric motor can be connected in parallel with the engine 10 to synchronously increase the speed to achieve the purpose of energy saving. In this embodiment, the battery set 85 can be arranged at an appropriate position in the tire 81, or inside or at the bottom of the armature core 84, but can be arranged at any place without protruding from the tire 81; Therefore, the position where the power storage device 80 can be placed includes the position of the spare tire in the rear trunk of the vehicle, or the position of the spare tire of a large truck or a trailers truck, and the tire 81 of the power storage device 80 has a shape of the size and fixing method can be compatible with the original spare tire, so there is no need to change the body design for finding the installation location, which is very convenient and practical.

Figure 13:
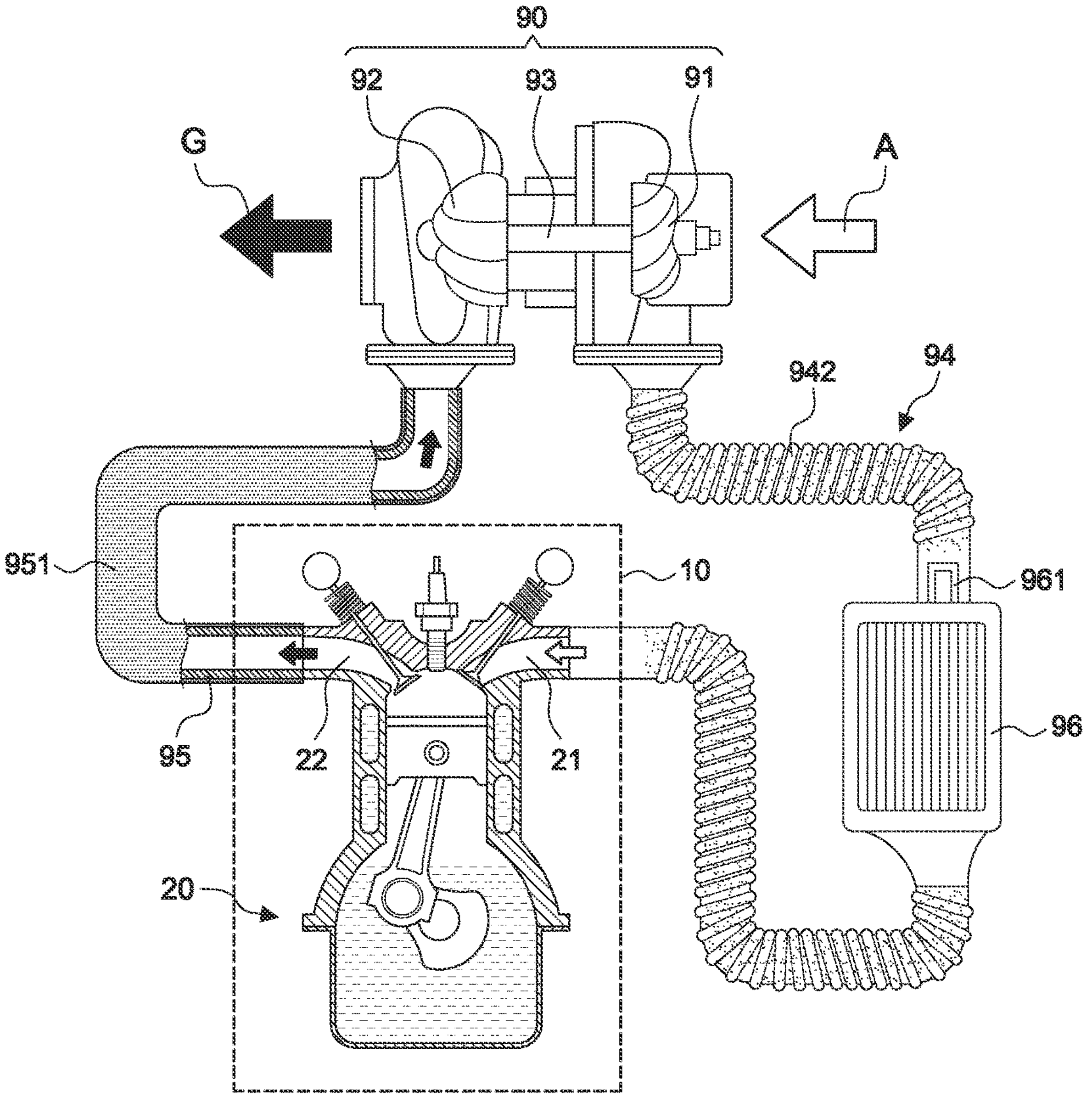
FIG. 13 is a schematic diagram illustrating the turbocharger of an applicable embodiment of the present invention.

Referring to FIG. 13, wherein on the intake hole 21 and the exhaust hole 22 of the engine 10 further include a turbocharger 90 which is mainly composed of a compressor 91 and a turbine 92, connected by a transmission shaft 93, the compressor 91 is connected by a spiral tube (smoothbore hose) 94 with the air intake hole 21, and a condenser 96 is arranged in the middle of the spiral tube 94, the turbine 92 is connected with the exhaust hole 22 by a thermal insulation pipe 95, and the exhaust gas discharged by the engine 10 impacts the turbine 92 to run at a high speed, thereby driving the coaxial compressor 91 rotate in the high-speed then forcing the pressurized air to be sent to the cylinder structure 20, wherein: the surface of the spiral tube (smoothbore hose) 94 is coated with heat dissipation paint 941, and a convex tube 961 is provided at the connection between the condenser 96 and the spiral tube (smoothbore hose) 94, so that when the air (A) enters the cylinder structure 20 through the compressor 91, producing a vortex gas and mechanical refrigeration effect; also, the thermal insulation pipe 95 is coated with thermal insulation paint 951; whereby, the colder the air (A) can make by the turbocharger 90 of the present invention when it enters the cylinder structure 20 through the compressor 91, the higher the combustion efficiency; and the temperature of the exhaust gas (G) is higher, so that the effect of the catalytic converter 13 will be better.

With the features disclosed above, the present invention has below effects:

1. A liquid catalyst pressured spraying exhaust gas reducing system 40 sprays the liquid catalyst 41 against the front end of the catalytic converter 13 to eliminate carbon deposits and prevent the flow holes 131 of the honeycomb carrier of the catalytic converter 13 from being blocked. Then, uses the second nozzle 461 to spray the liquid catalyst 41 on the front end of the secondary catalytic converter 52 to eliminate carbon deposits and prevent the sintered metal sieve body of the secondary catalytic converter 52 from being blocked. Furthermore, uses the exhaust gas bypass pipe 47 to guide the excess exhaust gas (G) blocked in the catalytic converter 13 to the front end surface of the secondary catalytic converter 52 to spray the liquid catalyst 41, so that the catalytic converter 13 can be prevented from blocking due to excessive exhaust gas (G) in front of it. Then, the present invention further uses the high temperature plasma 56 generated by the high temperature plasma exhaust gas reducing device 50, not only generates high plasma temperature to degrades the exhaust gas (G), and also generates "ultraviolet rays" to convert and degrade the exhaust gas (G).
2. A noise reduction device 60, using a BLUETOOTH® microphone 64 for capturing the internal noise of the engine 10, and a noise analysis circuit 65, reproduces and emit sound waves with the same amplitude but inverted phase as the noise for cancelling the noise.
3. The nano-platinum compound photocatalyst is added to the water tank and the fuel tank, and enters the engine 10 together with oil such as gasoline and diesel through the carburetor to burn, thereby reducing the temperature at which nitrogen and oxygen form nitrogen oxides; using nanometer ultrafine particle technology and the surface effect of photocatalyst to convert CO, $NO_x$ and HC into non-toxic gases to improve the effect of reducing pollution.
4. After the nano-platinum compound photocatalyst of the present invention enters the engine 10, a nano-platinum layer 27 is gradually formed on the top surface 251 of the piston 25, the inner wall of the cylinder structure 20 and the cooling water jacket 24, which can not only protect the piston 25 and the cylinder structure 20, also provide a catalytic effect on combustion, so as to improve the output efficiency of the engine 10, reduce toxic exhaust gas, and increase the service life.
5. A ultrasonic optical air intake vortex pipe 70 can convert the intake air A into a spiral airflow S and enter the combustion chamber 23 of the engine 10 to increase the kinetic energy of air fuel mixture, and the nano-platinum compound photocatalyst 73 and the UV light source 74 are used to catalyze the air moisture and decompose into Hydrogen and oxygen to promote burn and reduce exhaust gas; and a variable frequency ultrasonic generator 75 for outputting ultrasonic oscillations, which ultrasonic generator can automatically generate variable frequency ultrasonic waves in correspondence with the engine speed, and further imparts ultrasonic energy to the intake air.
6. The power storage device 80, converting excess power of the engine 10 while idling, braking, and descending a slope into the inertia of the flywheel 82 to charge slowly, when a sudden acceleration or starting vehicle is required, such as when the electric motor assists the engine 10 to start or accelerate or overtake, the magnet electric motor can be connected in parallel with the engine 10 to synchronously increase the speed to achieve the purpose of energy saving.
7. The turbocharger 90 of the present invention can make the air (A) colder when it enters the cylinder structure 20 through the compressor 91, and increase the combustion efficiency; and the temperature of the exhaust gas (G) is higher, so that the effect of the catalytic converter 13 will be better.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A device increasing engine efficiency and reducing exhaust and noise, comprising:

an engine, having at least one cylinder structure, the cylinder structure has an intake hole, an exhaust hole and a combustion chamber, a cooling water jacket arranged on the outer periphery, a piston arranged inside, and a driving element that drives the piston to reciprocate on the inner wall of the combustion chamber;

an air intake device connected to the intake hole for feeding outside air, having an air intake pipe and an air intake box, and an air filter is arranged in the air intake box;

an exhaust manifold connected to the exhaust hole, which is used to discharge combustion exhaust gas that then passes through an exhaust gas discharge pipe, a catalytic converter and a muffler; and a motor unit connected on a belt driving device of the engine, and the motor unit is a double-acting device of power generator and motor; wherein:

I). A liquid catalyst pressured spraying exhaust gas reducing system arranged at a front end and a rear end of the catalytic converter, including:

a). a liquid catalyst including platinum, which is placed in a container;

b). a first conveying pipe connected from the bottom of the container to convey the liquid catalyst into the exhaust gas discharge pipe at the front end of the catalytic converter, a tail end of the first conveying pipe is provided with a first nozzle, and the first nozzle sprays the liquid catalyst against the front end of the catalytic converter;

c). a pump arranged on the first conveying pipe to provide conveying power to the liquid catalyst in the first conveying pipe;

d). a solenoid valve, arranged on the first conveying pipe and behind the pump;

e). a computer, electrically connected to the pump and the solenoid valve;

f). a second conveying pipe connected from the first conveying pipe to convey the liquid catalyst into the exhaust gas discharge pipe at the rear end of the catalytic converter, and a tail end of the second conveying pipe is provided with a second nozzle, and the second nozzle sprays the liquid catalyst backward;

g). an exhaust gas bypass pipe, a front end of the exhaust gas bypass pipe is connected to the exhaust gas discharge pipe at the front end of the catalytic converter, and a rear end of the exhaust gas bypass pipe is connected to the exhaust gas discharge pipe at the rear end of the catalytic converter;

II). A high temperature plasma exhaust gas reducing device, which is arranged on the exhaust gas discharge pipe at the rear end of the catalytic converter and behind the second nozzle, and is arranged in a joint of a first connecting pipe and a second connecting pipe on the exhaust gas discharge pipe, including:

a). an annular joint seat being made according to a diameter of the first connecting pipe and the second connecting pipe, so as to be combined between the first connecting pipe and the second connecting pipe;

b). a secondary catalytic converter, which is a cup-shaped sintered metal sieve body, arranged on a front side of the annular joint seat, and the sintered metal sieve body contains embedded nano-gold and manganese materials;

c). a ceramic base arranged on a rear side of the annular joint seat, and the ceramic base is provided with numerous axial flow holes for allowing the combustion exhaust gas to pass through;

d). a multi-pole plasma gun arranged on the ceramic base, including at least two pairs of poles which are symmetrically installed, and are electrically connected to an external high voltage generating circuit for generating high temperature plasma;

III). A noise reduction device, connected to the side of the air intake box, comprising:

a). a resonance chamber connected to the side of the air intake box by a pipe body;

b). a speaker, arranged in the resonance chamber;

c). at least one BLUETOOTH® microphone, including arranged in the air intake box, for capturing internal noise of the engine and transmitting a noise signal;

d). a noise analysis circuit, arranged in the resonance chamber and electrically connected to the speaker, the noise analysis circuit receives the noise signal sent by the BLUETOOTH® microphone, reproduces and emits sound waves with the same amplitude but inverted phase as the noise for cancelling the noise.

2. The device increasing engine efficiency and reducing exhaust and noise as claimed in claim 1, further including a nano-platinum compound photocatalyst being added to engine oil and a water tank to make a top surface of the piston, an inner wall of the cylinder structure and the cooling water jacket be coated with a nano-platinum layer, the nano-platinum compound photocatalyst is made of diethyl benzene, molybdenum disulfide and nano-ultrafine gold and nano-titanium with a concentration of 480-4800 ppm.

3. The device increasing engine efficiency and reducing exhaust and noise as claimed in claim 1, wherein before the air filter in the air intake box having a UV light source, a negative ion generator and an ozone generator, and a nano-platinum compound photocatalyst is coated on the air filter and an inner side of the air intake box.

4. The device increasing engine efficiency and reducing exhaust and noise as claimed in claim 1, further including an ultrasonic optical air intake vortex pipe, which is arranged on the air intake pipe, the ultrasonic optical air intake vortex pipe having an axial tube body and an accommodating chamber radially arranged in a middle section of the axial tube body, an inner wall of the axial tube body is provided with helical grooves which can turn the intake air into a spiral airflow and enter the combustion chamber of the engine to improve fuel air mixture, and the inner wall of the axial tube body is coated with a nano-platinum compound photocatalyst, and having a UV light source which is used to catalyze the air moisture and decompose it into hydrogen and oxygen to improve combustion and reduce exhaust gas.

5. The device increasing engine efficiency and reducing exhaust and noise as claimed in claim 1, further including a power storage device arranged at the position of a spare tire in a rear trunk of a car, the power storage device includes a tire, an inner edge of the tire having a flywheel, and an inner periphery of the flywheel is fixed with a permanent magnet; an armature core arranged in the flywheel and corresponded to the permanent magnet, the armature core is connected to the motor unit by a wire, and generated electric power is stored by a battery set, thereby forming a magnetoelectric double-acting power storage device.

6. The device increasing engine efficiency and reducing exhaust and noise as claimed in claim 1, wherein on the intake hole and the exhaust hole of the engine further includes a turbocharger which is mainly composed of a compressor and a turbine, connected by a transmission shaft, the compressor is connected by a smoothbore spiral tube with the air intake hole, and a condenser is arranged in the middle of the spiral tube, the turbine is connected with the exhaust hole by a thermal insulation pipe, the thermal insulation pipe being coated with thermal insulation paint, and the exhaust gas discharged by the engine impacts the turbine to run at a high speed, thereby driving the coaxial compressor to rotate at high-speed and thereby forcing pressurized air to be sent to the cylinder structure, wherein: the surface of the spiral tube is coated with heat dissipation paint, and a convex tube is provided at a connection between a condenser and the smoothbore spiral tube, so that when air enters the cylinder structure through the compressor it produces a vortex gas.

* * * * *